(12) United States Patent
Oroskar et al.

(10) Patent No.: US 9,326,188 B1
(45) Date of Patent: Apr. 26, 2016

(54) MITIGATING INTERFERENCE USING BEAMFORMING

(71) Applicant: SPRINT COMMUNICATIONS COMPANY L.P., Overland Park, KS (US)

(72) Inventors: Siddharth S. Oroskar, Overland Park, KS (US); Maulik K. Shah, Overland Park, KS (US); John William Prock, Peculiar, MO (US); Jasinder P. Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 39 days.

(21) Appl. No.: 14/179,214

(22) Filed: Feb. 12, 2014

(51) Int. Cl.
*H04W 16/14* (2009.01)
*H04W 28/04* (2009.01)

(52) U.S. Cl.
CPC ............ *H04W 28/048* (2013.01); *H04W 16/14* (2013.01)

(58) Field of Classification Search
None
See application file for complete search history.

(56) References Cited

U.S. PATENT DOCUMENTS

2003/0114195 A1* 6/2003 Chitrapu et al. ............... 455/562
2010/0311452 A1* 12/2010 Li et al. .......................... 455/509

* cited by examiner

*Primary Examiner* — Philip Sobutka

(57) ABSTRACT

Systems, methods, and computer-readable media for facilitating mitigation of interference using beamforming techniques are provided. In some embodiments, interference periodicity and interference duration associated with interference of a radar beam are used to determine an extent of time during which a lobe of a communication tower is to be modified in power, direction, or a combination thereof. Upon an occurrence of the extent of time, the lobe of the communication tower is modified in power, direction, or a combination thereof so that the lobe does not interfere with a radar beam emitted from a radar remote from the communication tower.

20 Claims, 7 Drawing Sheets

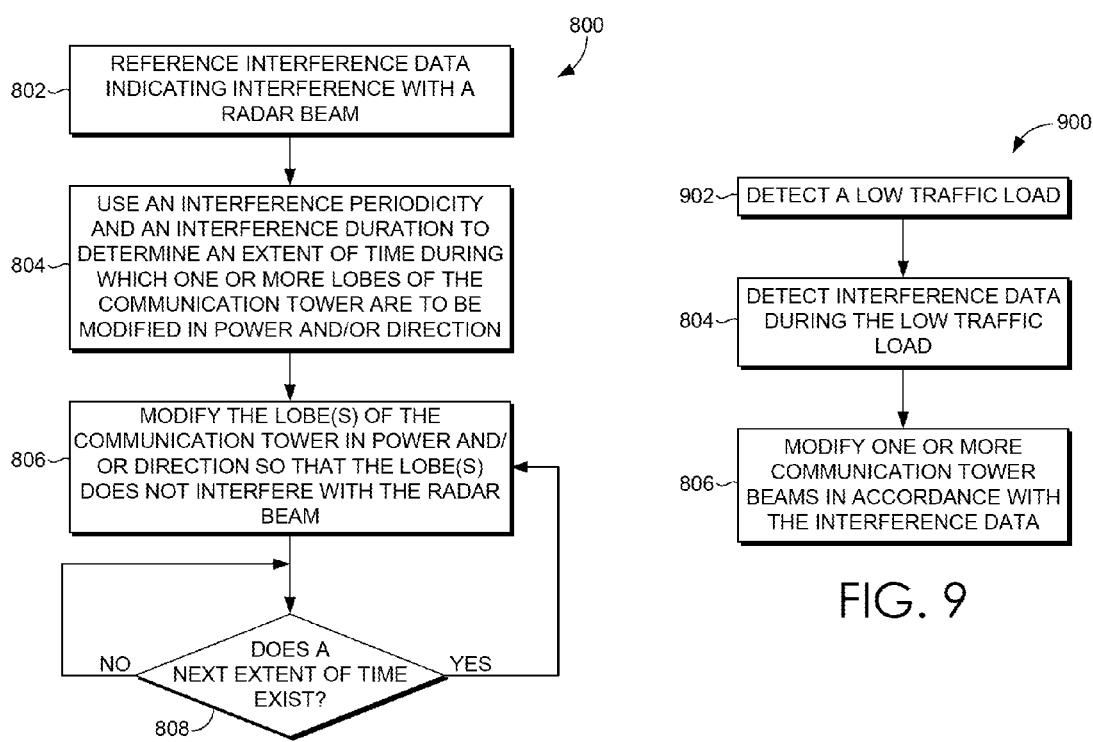

MITIGATING INTERFERENCE USING BEAMFORMING

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, detecting interference data in association with radars. Utilizing embodiments hereof, interference data are used to mitigate interference associated with radar beams transmitted by a radar. In this regard, interference data, such as interference periodicity and interference duration, are used implement beamforming of communication tower lobes to avoid interference with radar beams.

BRIEF DESCRIPTION OF THE DRAWINGS

Illustrative embodiments of the present invention are described in detail below with reference to the attached drawing figures, and wherein:

FIG. 8 provides an exemplary first method for facilitating modification of communication tower beams to minimize interference with a radar, in accordance with embodiments of the present invention; and FIG. 9 provides an exemplary second method for facilitating modification of communication tower beams to minimize interference with a radar, in accordance with embodiments of the present invention.

DETAILED DESCRIPTION

Figure 1:
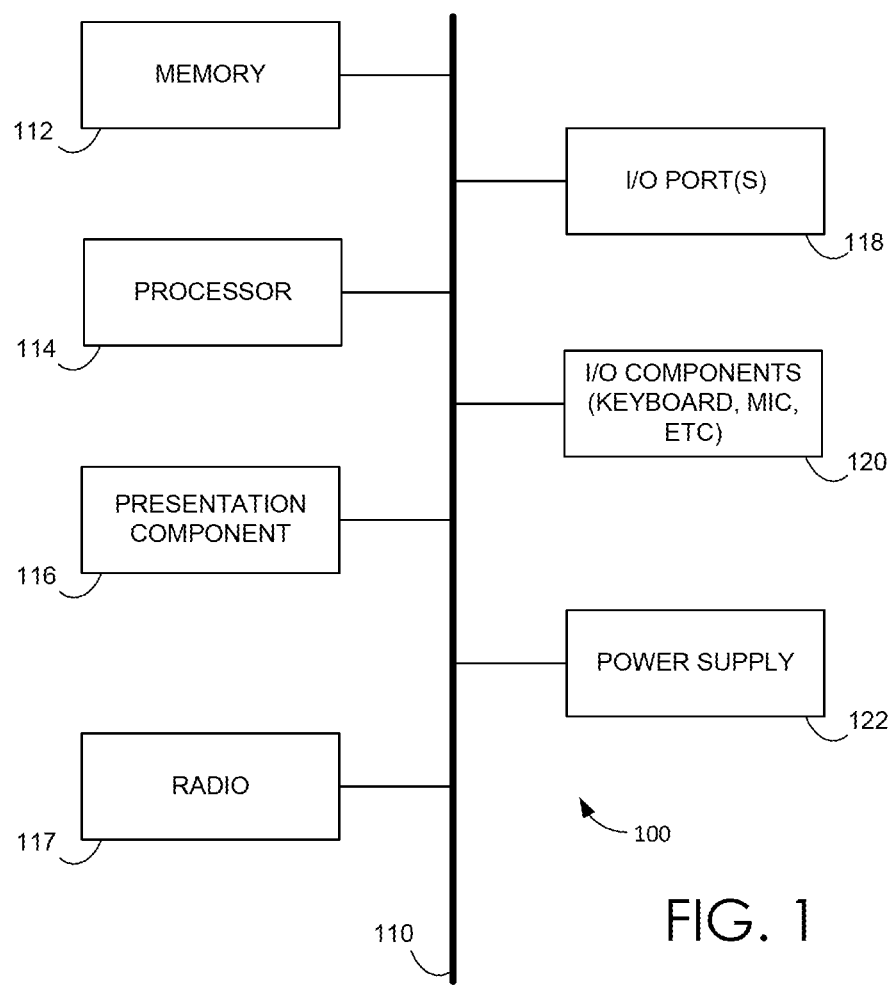
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
CD-ROM Compact Disk Read Only Memory
CDMA Code Division Multiple Access
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
PC Personal Computer
PCS Personal Communications Service
PDA Personal Digital Assistant
RAM Random Access Memory
ROM Read Only Memory
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 26th Edition (2011).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative computing device according to one embodiment is provided and referenced generally by the numeral 100. Although some components are shown in the singular, they may be plural. For example, computing device 100 might include multiple processors or multiple radios, etc. As illustratively shown, computing device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, radars and communication towers positioned within a proximity of one another can cause interference when operating on a same or similar frequency. In this regard, a communication tower transmitting and/or receiving signals via a particular frequency or range of frequencies can interfere with data detected at a radar operating at a similar frequency when the communication tower and the radar are in a similar vicinity. Similarly, a radar operating via a particular frequency or range of frequencies to transmit and receive radio waves can interfere with signals communicated from and/or to a nearby communication tower. For example, assume that a communication tower operates using a 2700 megahertz frequency and a radar operates using a 2600 megahertz frequency. Further assume that the communication tower and the radar are positioned within one mile from one another and that the communication tower is pointing in the direction of or is in the line of sight of the radar. In such a case, when the communication tower transmits and/or receives signals, for example from mobile devices, such signals can interfere with the wave pattern detected by the radar thereby altering data detected at the radar.

Embodiments of the present invention facilitate detecting interference data in association with a radar. In this regard, a communication tower can detect when its signals would interfere with radar beams of a nearby radar. Such interference data can include, for example, interference periodicity, interference duration, and the like. In embodiments, detection of interference data occurs when a low traffic load exists at the communication tower. The detected interference data can then be used to minimize or reduce prospective interference with the radar. For example, such interference data can be used to implement a beamforming technique applied at the communication device that is designed to avoid interference between the communication tower and the radar.

Accordingly, in one aspect, the present invention is directed to one or more computer-readable storage media having computer-executable instructions embodied thereon that, when executed, perform a method for facilitating mitigation of interference using beamforming. The method includes utilizing interference periodicity and interference duration associated with interference of a radar beam to determine an extent of time during which one or more lobes of a communication tower are to be modified in power, direction, or a combination thereof. The method also includes upon an occurrence of the extent of time, modifying at least one of the one or more lobes of the communication tower in power, direction, or a combination thereof so that the at least one of the one or more lobes does not interfere with a radar beam emitted from a radar remote from the communication tower.

In another aspect, embodiments of the present invention are directed to one or more computer-readable storage media having computer-executable instructions embodied thereon that, when executed, perform a method for facilitating mitigation of interference using beamforming. The method includes detecting a low traffic load at a communication tower. The method also includes calculating interference data during the low traffic load, the interference data comprising an interference periodicity and an interference duration that indicate a periodic interference associated with a radar remote from the communication tower. The method further includes modifying one or more communication tower beams in accordance with the interference data indicating the periodic interference of the radar such that the one or more communication tower beams minimize interference with a radar beam from the radar.

In yet another aspect, a method for facilitating mitigation of interference using beamforming is provided. The method includes recognizing a set of subframes during which a radar beam emitted from a radar that is remote from a communication tower would be oriented within a coverage area of a lobe of the communication tower. The method also includes applying a beamforming technique in association with the lobe of the communication tower so that the lobe does not interfere with the radar beam during the set of subframes that the radar beam would be oriented within the coverage area of the lobe of the communication tower.

Figure 2:
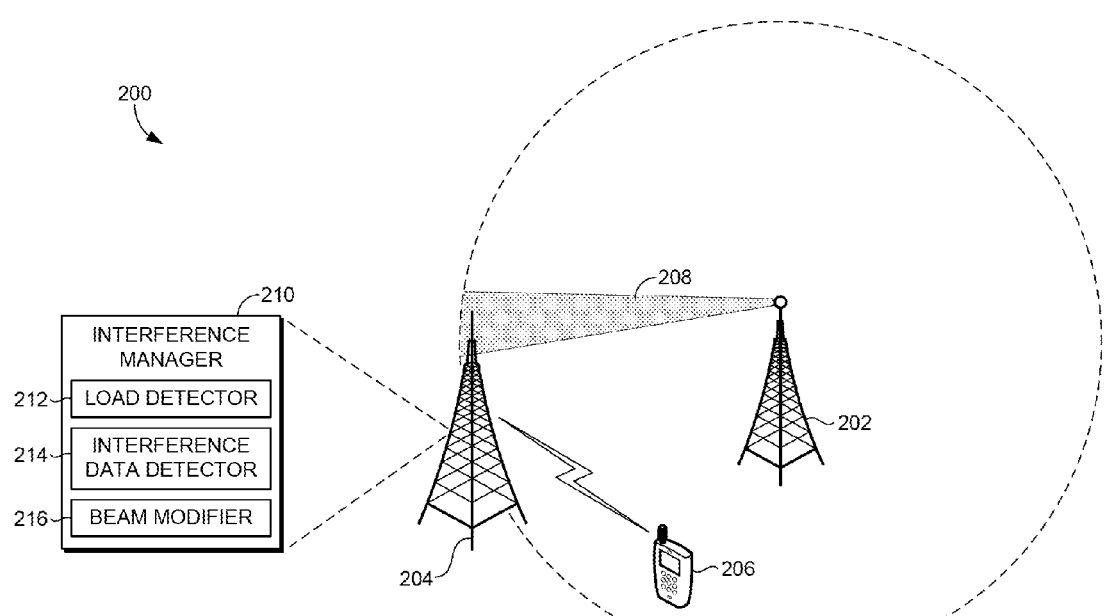
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a radar 202 transmits a radar beam 208 of radio waves. A radar refers to an object detector that uses radio waves to determine range, altitude, direction, or speed of objects. In this way, a radar might be used to detect, by way of example and not limitation, aircrafts, ships, spacecrafts, missiles, vehicles, weather formations, terrain, etc., and data associated therewith. In operation, a radar dish or antenna transmits pulses of radio waves or microwaves which bounce off objects in the path. The object returns a small part of the wave's energy to the radar.

Generally, the radar beam 208 rotates in 360 degrees around the radar 202. As such, from the perspective of a nearby communication tower, such as communication tower 204, the radar 202 performs a periodic scan. The radar beam 208 of radio waves can rotate or scan at any speed. For example, a radar may transmit a beam of radio waves in revolutions of six times per minute. Further, the beam width of the radar beam 208 of radio waves can be any size. For instance, the beam width of the radar beam 208 might be approximately one degree. In such a case, the radar 202 can obtain 360 individual measurements six times per minute. In embodiments, the radar 202 is operated by or controlled by an entity that is different or external from the entity that operates or controls the communication tower 204. For example, a communication tower might be implemented and/or owned by a first entity (e.g., wireless telecommunications provider) while the radar is implemented and/or owned by a second entity (e.g., a non-wireless telecommunications provider or a different wireless telecommunications provider). Although the radar 202 is described as providing a rotational scan, as can be appreciated, the radar 202 might be non-rotating such that it periodically transmits a beam of radio waves in a non-rotating manner.

A user device 206 may communicate, for example, with another mobile device, a server, or the like using the communication tower 204. The user device 206 may take on a variety of forms, such as a personal computer (PC), a laptop computer, a tablet, a mobile phone, a personal digital assistant (PDA), or any other user device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunications network is utilized for communication (e.g., voice and/or data communication).

In communicating with other devices, signals are transmitted to and/or from the communication tower 204 associated with a network. The communication tower 204 refers to a tower that facilitates wireless communication between user devices. Depending on the wireless communication technologies employed by the network, a communication tower might be referred to as or include a base transceiver station (BTS), a radio base station (RBS), a base station (BS), a node B (in 3G networks), or an eNodeB (in LTE network).

The communication tower 204 may communicate with the user device 206 via a network(s). A network might be a single network or multiple networks, as well as being a network of networks. In embodiments, network is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), Long Term Evolution (LTE), Universal Mobile Telecommunications Systems (UMTS), Integrated Digital Enhanced Network (iDEN), WiMAX, 3G, 4G, and Personal Communications Service (PCS). In one embodiment, the network is or includes a LTE network. A wireless telecommunications network might include an array of devices.

In operation, the communication tower 204 facilitates avoiding interference with the radar 202. In this regard, the communication tower detects interference data in association with the radar 202. Thereafter, such interference data can be used to implement a beamforming mechanism to avoid interference with the radar 202. FIG. 2 illustrates the communication tower 204 having an interference manager 210 that facilitates avoiding interference with the radar 202. The interference manager 210 includes a load detector 212, an interference data detector 214, and a beam modifier 216. Interference manager 210 is but one example of a suitable environment and is not intended to suggest any limitation as to the scope of use or functionality of the invention. Neither should the interference manager 300 be interpreted as having any dependency or requirement relating to any one or combination of components illustrated. For example, functions described as being performed by the load detector 212 and the interference data detector 214 could be performed by a common component.

Initially, the load detector 212 is configured to detect or monitor traffic load associated with the communication tower 204. Traffic load refers to an amount or load of traffic of a particular communication tower. Traffic can include signals or data being transmitted from or being communicated to the communication tower for any number of reasons. In embodiments, the load detector 212 detects or monitors the traffic load of the communication tower.

Traffic load can be detected or monitored in any number of ways. In embodiments, the load detector 212 can detect or monitor load continuously or periodically (e.g., every 60 seconds). In some embodiments, traffic load might be monitored by way of a noise rise. A noise rise refers to a noise value above or over thermal noise (i.e., independent of thermal noise). A higher noise rise value implies more user devices are using the communication tower, and a lower noise rise value implies less user devices are using the communication tower. In an additional or alternative embodiment, the load detector 212 might detect a total noise level that, for instance, includes thermal noise and noise rise.

Irrespective of the method used for detecting or monitoring traffic load, the traffic load can be tracked over time such that the load detector 212 can identify, determine, or detect a low traffic load. A low traffic load refers to a traffic load that is below a threshold traffic load. For instance, a low traffic load might be detected when the communication tower 204 detects little to no noise rise, for example, based on little to no data transmissions to and/or from the communication tower. Stated differently, the load detector 212 might detect a low traffic load when nearly only thermal noise or background noise is detected. Such a low traffic load is oftentimes detected during the night. In other cases, such a low traffic load might be detected when the communication tower, or a portion thereof, is down for maintenance.

In some embodiments, upon detecting a low traffic load, the load detector 212 might initiate the detection of interference data. For example, the load detector 212 may notify the interference data detector 214 of a low traffic load or otherwise trigger the interference data detector 214, or other component, to begin detecting interference data.

Although FIG. 2 illustrates a load detector 212 to detect load and/or initiate the detection of interference data, in some cases, another component or a technician might initiate the detection of interference data. For example, in instances that a communication tower, or portion thereof, is not operating to send and/or receive signals (e.g., down for maintenance), a technician might initiate detection of interference data. As another example, a technician might initiate detection of interference data at 3:00 a.m. either manually or based on an automatic occurrence (e.g., daily, weekly, monthly, etc.).

The interference data detector 214 is configured to detect interference data in association with the radar 202. Interference data, as used herein, refers to data related to interference associated with a radar. In this regard, interference data corresponds with interference between a communication tower and a radar. As the radars provide periodic radar beams, the interference data generally corresponds with periodic data.

To detect interference data, the interference data detector 214 can monitor signal levels of the communication tower 204 such that interference data can be identified therefrom. It is contemplated that signal levels to detect interference data are monitored during a low traffic load time period (e.g., as identified by the load detector 212 of FIG. 2), but embodiments of the invention are not limited to such implementations. Detecting interference data during a low traffic load time period facilitates acquisition of more accurate interference data.

While a low traffic load is valuable for detecting interference data, as can be appreciated, in some cases, the communication tower 204 can be used for communications even when signal levels are being monitored to detect interference data without impacting the accuracy of the interference data. For instance, the communication tower 204 could use or assign resource blocks associated with a frequency range not specifically being monitored for signal levels. In other words, during an interference detection time period, the communication tower 204 might not assign resource blocks associated with the frequency range for which it is measuring corresponding signal levels. Resource blocks associated with a frequency(s) for which signal levels are not be measured, however, can be assigned. As a result, the communication tower 204 can facilitate traffic for frequencies not being monitored.

By way of example, and without limitation, assume that a wireless telecommunications network associated with a communication tower operates between 2600 and 2700 megahertz. Further assume that a nearby radar operates using 2704 megahertz. In such a case, resource blocks associated with frequencies closer to 2700 megahertz may not be assigned such that corresponding signal levels can be more accurately monitored, while resource blocks associated with frequencies closer to 2600 megahertz can be assigned to facilitate communications of mobile devices.

The interference data detector 214 can monitor signal levels for an interference detection time period. Such an interference detection time period may be any amount of time used to monitor signal levels. In some embodiments, signal levels are monitored for a time duration, such as 60 seconds. In such an embodiment, interference can be measured for any number of time durations, such as a 60 second time duration every 10 minutes or 10 consecutive 60 second time durations. As can be appreciated, such a time duration is generally established to be at least as long as one complete rotation or scan of a beam from the radar.

In monitoring interference, the interference data detector 214 can measure the signal level of a receiver of the communication tower. In some embodiments, the signal levels associated with a target frequency range are measured. A target frequency range refers to a range or span of frequencies for which signal levels are to be measured and/or interference data are to be detected. A target frequency range might be the entire range of frequencies being used by a communication tower or a portion of frequencies being used by a communication tower. In this regard, an entire frequency range being used by the communication tower might not be interfering with a radar, or vice versa. For instance, only signals transmitted and/or received at a higher frequency might be measured when the high frequency is the frequency that might interfere with the radar.

In measuring signal levels, various interference data can be measured and recorded. For example, interference data indicating a magnitude or power of the signal can be measured or identified, for instance, in terms of decibels. In this regard, interference data can include an amplitude of the signal at a certain frequency. As another example of interference data, interference data can include the periodicity or reoccurring time period for detecting indications of interference. In this way, a periodicity of interference (i.e., interference periodicity) indicates the timing of a radar antenna being aligned with a communication tower. For instance, a periodicity of ten seconds indicates that every ten seconds a signal is initially detected. As described in more detail below, such a periodicity can additionally or alternatively be defined by subframes, for example, in a LTE environment. In yet another example, interference data can include interference duration for a particular wave of signals detected for an interfering interval. To this end, in a time period during which a radar beam is aligned with the communication tower, the duration of such a time period can be measured or identified. Again, as described in more detail below, an interference duration can be additionally or alternatively defined by subframes, for instance, in a LTE environment. As another example, a frequency at which signals are being provided can be detected. For example, in a LTE environment, a frequency being used for signal transmission can be identified based on the resource blocks associated with a periodic interference. Additionally or alternatively, a number of resource blocks receiving a periodic interference can be identified as interference data. The examples provided herein are not intended to limit the scope of embodiments of the present invention and any other data can be measured or captured.

To determine such signal levels, in some cases, thermal noise or a noise floor, such as an average noise floor, during a low traffic time period can be compared to the measured signal levels to determine if there is any pattern of reoccurrence to the noise rise. If a pattern is detected, such rises in noise can be identified as a periodic interference or an interference interval. In accordance therewith, various interference data, such as center, amplitude, and duration of each interfering interval, can be calculated.

In accordance with the reoccurring pattern or upon analysis of the interference data, a periodic interference can be detected. For instance, as resource blocks have not been assigned for data transmission and a periodic or cyclical detection of signals are identified, a periodic interference can be recognized. In some cases, the specific resource blocks or quantity of resource blocks associated with the periodic interference can also be identified (e.g., the duration and relative amplitude of the interference per resource block).

In some cases, a periodic interference might be determined based on a pattern of signals and, thereafter, specific interference data can be detected in association with interference intervals. In other cases, specific interference data might be determined in association with a pattern of signals and, based on such common interference data (e.g., magnitudes, periodicities, amplitudes, durations, etc.), a periodic interference can be recognized.

Figure 3:
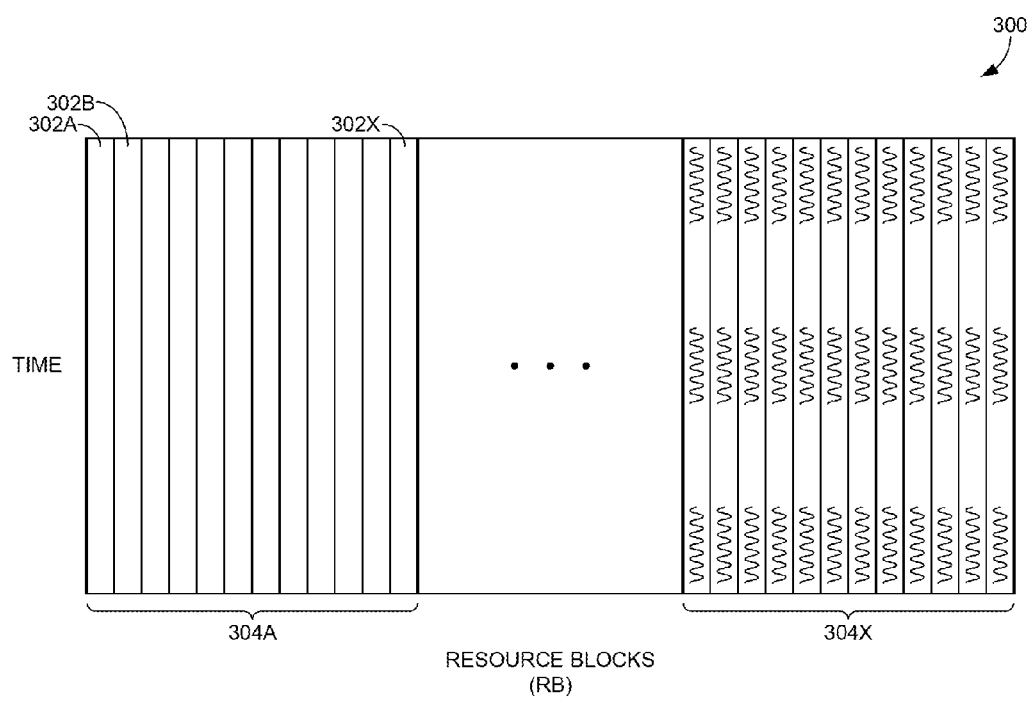
FIG. 3 provides an exemplary illustration of periodic interference in a LTE environment, in accordance with embodiments of the present invention.

By way of example only, and with reference to FIG. 3, in a LTE environment, resource blocks are utilized for data transmissions. Within a LTE carrier bandwidth of 20 MHz 300, for example, the 20 MHz are divided in chunks or segments of 15 kHz 302A, 302B, 302X. Signals can be detected in the 15 kHz segments. A resource block, such as resource block 304A, comprises 12 consecutive 15 kHz segments, or 180 kHz. In some embodiments, 20 MHz includes 100 of such resource blocks. As illustrated with respect to resource block 304X operating near a frequency of 2704, a periodic interference can be detected based on the periodic nature of the signals captured over time. For each of the interference intervals, various interference data can be captured such as, for instance, a periodicity of the interference, an amplitude of the interference, a duration of the interference, or the like.

Turning now to the beam modifier 216, the beam modifier 216 is directed to modifying beamforming to redirect beams or lobes of the communication tower 204 to prevent interference with the radar 202. To this end, it is contemplated that the beam modifier 216 prevents or modifies beam transmission when the radar beam 208 is oriented in the direction of the communication tower 204 beams or lobes. Beamforming (or spatial filtering) refers to a signal processing technique used to direct or control signal transmission and/or reception.

Generally, a radiation pattern of a communication tower antenna includes a pattern of lobes or beams at various angles and directions. As such, a communication tower beam or lobe (also referred to as beam or lobe) includes radio waves or signals emitted or received in a particular direction or angle. As can be appreciated, a communication tower can emit any number of lobes. For example, a communication tower might simultaneously emit a single lobe, six lobes, or eight lobes. Further, such lobes can be main lobes, side lobes, or the like. As can be understood, the lobes are associated with a radiated signal strength and can be separated by nulls at which the radiated signal strength falls to or near zero. In aggregate, the lobes may cover any range of space up to 360 degrees. For example, in some embodiments, the lobes might span 65 degrees, 90 degrees, 180 degrees, or 360 degrees in the horizontal plane.

Initially, the beam modifier 216 references interference data. Such interference data might include, for instance, a periodicity of the interference, an amplitude of the interference, a duration of the interference, or the like. The interference data can be referenced by receiving, retrieving, or otherwise accessing the interference data.

The interference data pertaining to the timing of a periodic external source, such as radar 202, can be used by the beam modifier 216 to reduce or prevent interference therewith. In this regard, the beam modifier 216 may utilize the interference data to redirect or control a beam(s) of the communication tower such that it not pointed in the direction of a periodic radar beam. A communication tower lobe(s) can be modified in any number of ways to prevent interference with a periodic radar beam. For instance, a beam can be produced in a different angle or direction in such a manner that the nulls of the beams coincide with the orientation of radar. As another example, in association with a radar beam pointing in the direction of a communication tower, the communication tower lobe might be removed or reduced such that no signal (i.e., radiated signal strength of zero) or a minimized signal is transmitted to avoid interference with the radar beam.

The beam modifier 216 can modify the lobe(s), for example, by controlling the geometry, phase, and/or relative amplitude or magnitude of the signal at the communication tower. By configuring beamforming geometry, relative magnitude, and phase weightings in association with the lobe(s), the shape and direction of lobes and nulls can be controlled. As such, the beam modifier 216 can focus or steer transmission or reception of signals in a particular direction to alleviate interference with a radar beam, such as radar beam 208.

Figure 4A:
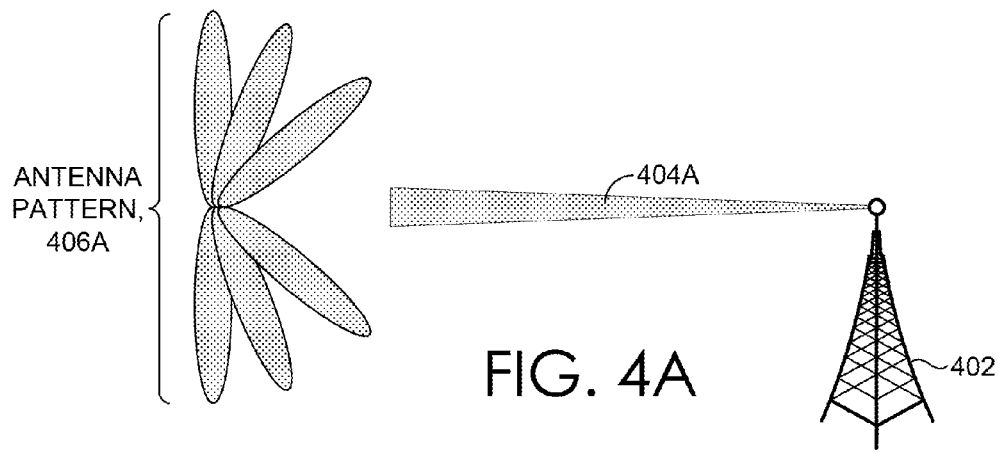
FIGS. 4A-4C provide exemplary illustrations of beamforming modifications based on interference associated with a radar, in accordance with embodiments of the present invention.
Figure 4B:
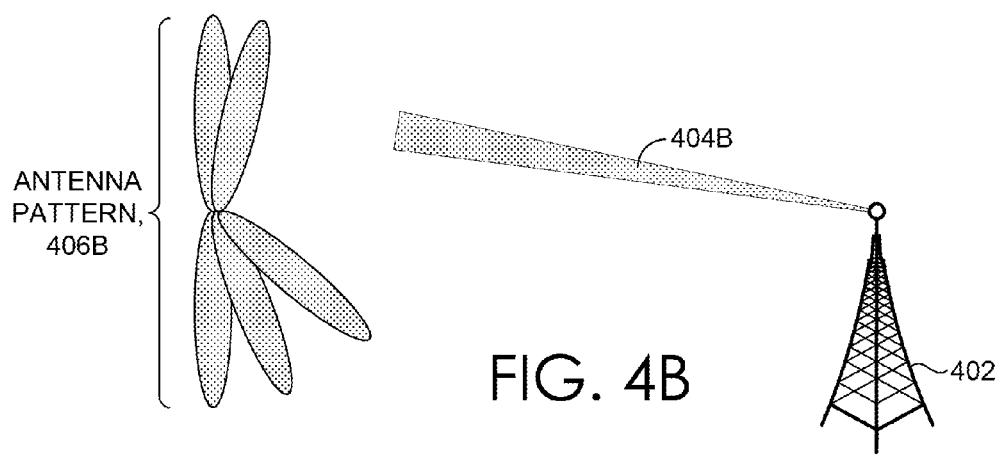
Figure 4C:
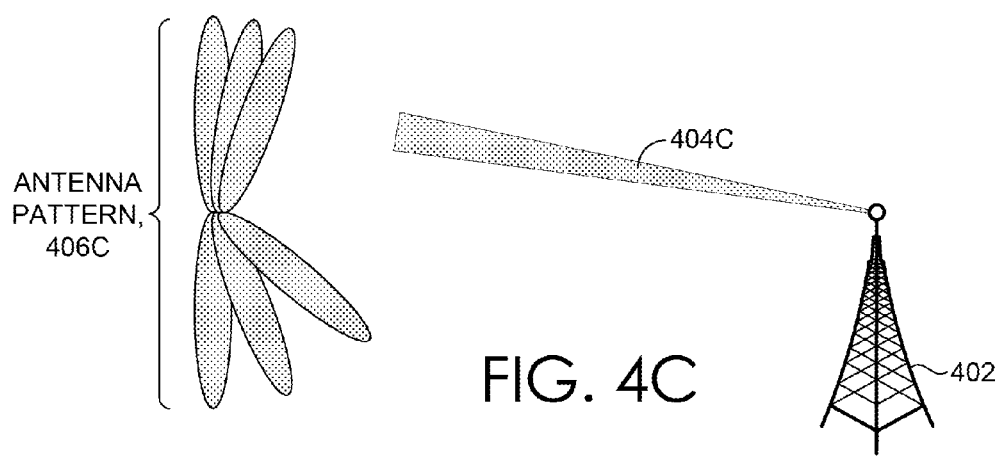

By way of example only, and with reference to FIGS. 4A-4C, a radar 402 having a radar beam 404A, 404B, and 404C, respectively, is depicted. FIG. 4A depicts the radar beam 404A positioned in a first direction. As such, a beam modifier 216 can modify beamforming of the set of lobes 406A such that a null is oriented in the direction of the radar beam 404A. As the radar beam moves, the beam modifier 216 modifies the lobes to prevent interference with the radar beam. For instance, as illustrated in FIG. 4B, the radar beam 404B transmitted from the radar 402 is positioned in a second direction. As a result, the set of lobes 406B are modified such that a null is oriented in the second direction of the radar beam. As illustrated in FIG. 4B, a lobe has been removed (or minimized) from the set of lobes illustrated in FIG. 4A to prevent interference with the radar beam 404B. By comparison, FIG. 4C illustrates modifying lobe directions to minimize interference with the radar beam 404C by steering the lobes away from the radar beam and thereby steering the power null location in the direction of the radar beam 404C. As such, a beam modifier 216 can optimize the lobe and null power and/or direction to minimize interference with the radar beam.

In operation, to determine a time at which to modify a communication tower beam(s) or lobe(s), interference data including periodicity can be utilized. To this end, during the time at which a radar beam is expected to be pointed in the direction of the communication tower, one or more lobes can be adjusted or modified to minimize or prevent interference with the radar beam. For example, assume that the periodicity of detecting a radar beam is every 10 seconds. In such a case, upon the lapse of a 10 second time duration, the beam modifier 216 can modify the lobes to prevent interference with the radar beam. As described above, such modification can be modifying the power of the lobe(s), modifying the direction of the lobe(s), or the like.

Further, as can be appreciated, lobe modification may occur in accordance with an interference duration. As previously described, a radar beam might be pointed in the direction of the communication tower for a duration of time (i.e., an interference duration). As such, a lobe or set of lobes might be modified during or throughout the time duration to avoid interference. In some cases, a single modification might be applied to one or more lobes during the entire time duration. For instance, the power of all of the lobes might be minimized during the interference duration. In other cases, multiple modifications might be applied to lobes during the interference duration. For example, as a radar beam rotates, in a first portion of the interference time duration, a first and second lobe might be modified while a third and fourth lobe are not modified. As the radar beam rotates, during a second portion of the interference time duration, a second and third lobe might be modified while the first and fourth lobe are not modified. Continuing with rotation of the radar beam and a third portion of the interference time duration, only the third and fourth lobe might be modified based on the position of the radar beam. During a final portion of the interference time duration (i.e., before the radar beam rotates away from the interference coverage of the communication tower), the fourth lobe might be modified while the first, second, and third lobes are not modified. Based on the periodic nature of the radar beam, such modifications to lobe power and/or direction can be repetitive to continually align with the periodicity of the radar beam.

In connection with determining a direction and/or power at which to modify a lobe, other information might be considered. For example, assume a user device positioned at one location is connected to the communication tower. In such a case, a particular lobe being modified might be moved in the direction toward the user device, as opposed to away from the user device, in an effort to maintain signal strength associated with the user device.

Figure 5:
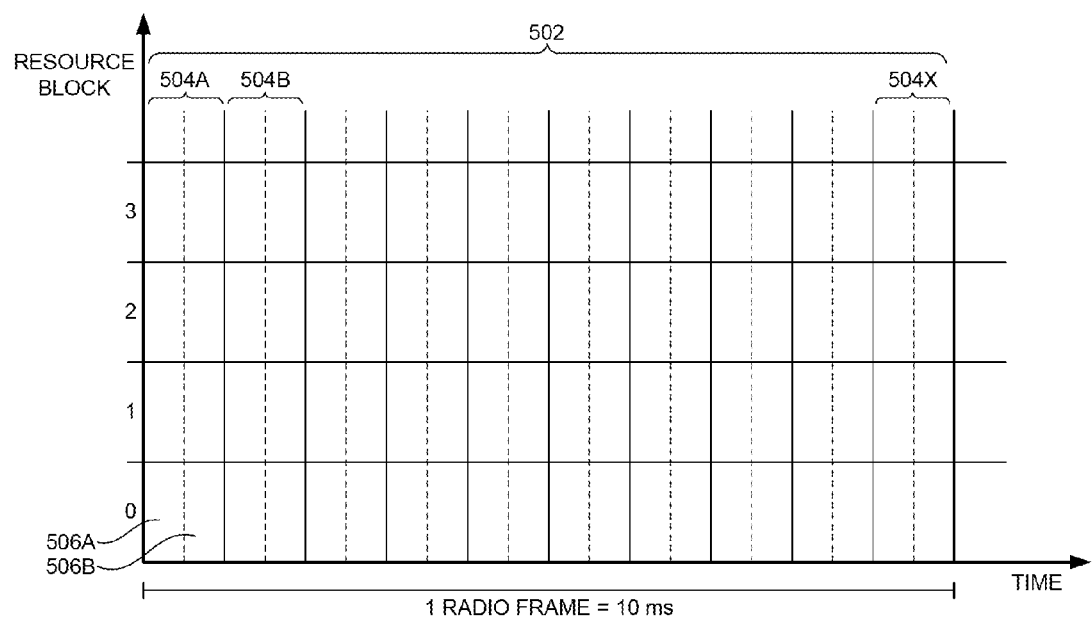
FIG. 5 illustrates an exemplary time domain in a LTE environment, in accordance with embodiments of the present invention.

In a LTE environment, the beam modifier 216 may calculate subframes during which the radar beam would be oriented in the coverage area of the communication tower. As described above, the periodicity of the interference and the time duration of the interference resulting from the radar beam can be used to calculate such subframes. FIG. 5 illustrates an exemplary time domain in a LTE environment. In LTE, a ten millisecond radio frame 502 is divided into ten subframes, for example 504A, 504B, and 504X. Each subframe is divided into two slots of 0.5 milliseconds, for example, 506A and 506B. A single slot corresponds with a resource block. Such resource blocks can be associated with varying frequencies across a LTE carrier bandwidth (e.g., 20 MHz). As such, subframes coinciding with a detection of a periodic interference with a radar beam can be identified. Although described with respect to the beam modifier 216, as can be appreciated, such a calculation can be performed in association with the interference data detector 214. For example, the interference periodicity and/or interference duration detected by the interference data detector 214 can be measured in terms of subframes.

Upon determining a set of one or more subframes impacted by the interference of a radar beam, the beam modifier 216 can modify a communication tower lobe(s) in association with the subframes during which interference is expected. In embodiments, the beam modifier 216 can use a pre-coding matrix to create a lobe using beam forming in such a manner that the nulls of the beam coincide with the orientation of the radar beam. Such a matrix can be used to determine a direction and/or power for a particular lobe during a set of subframes. For instance, coefficients of the matrix can facilitate determining amplitude and phase of signals input into an antenna(s) that allows for steering the lobe(s). As can be appreciated, analysis for each lobe can be performed to determine the manner in which to manipulate or modify each lobe during various time intervals (e.g., subframes). For instance, a first lobe might be modified during a set of subframes 1-4 while a second lobe might be modified during a set of subframes 3-6.

As can be appreciated, in some embodiments, the beam modifier 216 is configured to apply the beam forming techniques described above when resource blocks associated with a frequency or frequency range that may interfere with the frequency of the radar 202. In this manner, if a frequency range being used by a communication tower does not interfere with a frequency(s) used by the radar 202, such beam forming techniques to periodically modify communication tower lobes are not applied.

Although network environment 200 is illustrated with single components, as can be appreciated, the components are scalable and any number of each of the components may exist in the network environment. Further, although not illustrated herein, additional components or combination of components may exist within the network environment 200. While FIG. 2 is generally described in relation to a periodic radar, as can be appreciated, any other periodic interfering signals are also contemplated in accordance with embodiments described herein. Further, although generally discussing periodic interference, non-periodic interference could also be assessed and, thereafter, beamforming techniques described herein could be applied to avoid interference with non-periodic signals.

Figure 6:
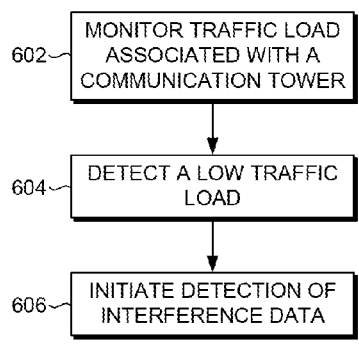
FIG. 6 provides an exemplary first method for facilitating identification of interference data, in accordance with embodiments of the present invention.
Figure 7:
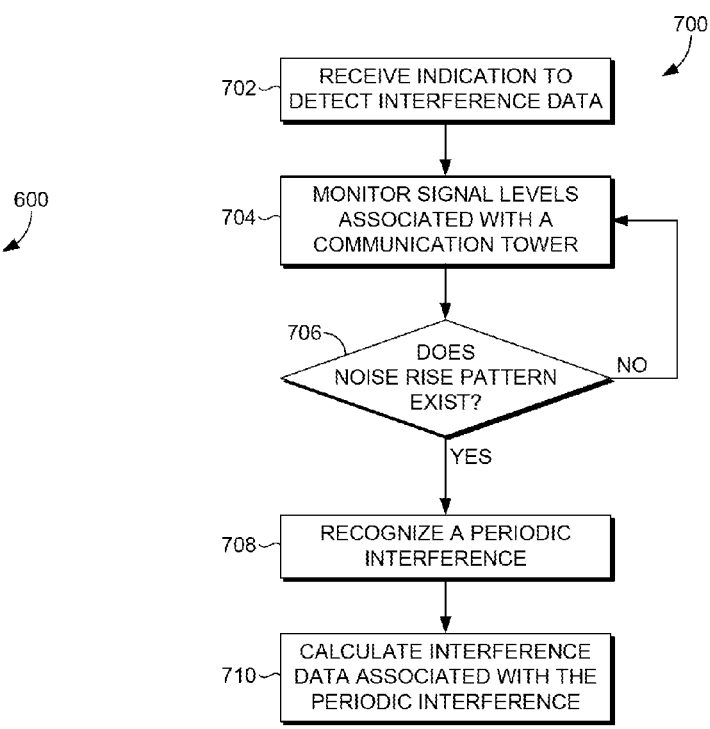
FIG. 7 provides an exemplary second method for facilitating identification of interference data, in accordance with embodiments of the present invention.

Turning now to FIGS. 6-9, methods for identifying interference data and utilizing such data to minimize interference with a remote radar are provided. In particular, FIGS. 6 and 7 show flow diagrams illustrating methods to facilitate identifying interference data, in accordance with embodiments of the present invention. FIGS. 8 and 9 show flow diagrams illustrating methods to facilitate modifying beams or lobes of a communication tower to minimize interference with a radar, in accordance with embodiments of the present invention. It will be understood by those of ordinary skill in the art that the order of steps shown in the method 600 of FIG. 6, method 700 of FIG. 7, method 800 of FIG. 8, and method 900 of FIG. 9 are not meant to limit the scope of the present invention in any way and, in fact, the steps may occur in a variety of different sequences within embodiments hereof. Any and all such variations, and any combination thereof, are contemplated to be within the scope of embodiments of the present invention.

With initial reference to FIG. 6, in embodiments, method 600 can be performed at a communication tower, such as communication tower 204 of FIG. 2. More specifically, method 600 might be performed by load detector 212 of FIG. 2. Initially, as indicated at block 602, traffic load associated with the communication tower is monitored. At block 604, a low traffic load is detected. In some embodiments, a low traffic load is detected when the traffic load falls below a traffic load threshold, for example, for a particular period of time. Based on detecting a low traffic load, at block 606, detection of interference data is initiated. Detection of interference data might be initiated, for example, by initiating monitoring of signal levels to identify a periodic interference pattern.

Turning now to FIG. 7, in embodiments, method 700 can be performed at a communication tower, such as communication tower 204. In particular, method 700 might be performed by an interference data detector, such as interference data detector 214 of FIG. 2. Initially, at block 702, an indication to detect interference data is received. In some embodiments, such an indication is received based on an automatic detection of existence of a low traffic load. In other cases, such an indication is received based on user input, for example, upon a user selection to detect interference data (e.g., when communication tower is being repaired). At block 704, signal levels associated with a communication tower are monitored. As can be appreciated, signal levels can be monitored for an interference detection time period that can be any time period during which signal levels are monitored. In some embodiments, signal levels are monitored in association with a particular target frequency range, for example, 2650 to 2750 MHz.

At block 706, it is determined if a noise rise pattern exists in association with the monitored signal levels, or a portion thereof. In some implementations, a noise rise pattern may be determined when the noise rise repetitively occurs to an extent beyond a noise floor (e.g., average thermal noise). As can be appreciated, a pattern threshold value may be used to determine whether a noise rise pattern exists. In this regard, a particular signal level, signal level periodicity, signal level duration, a number of occurrences of a particular signal level, or the like may need to attain corresponding threshold values in order to for a noise rise pattern to be designated. If it is determined that a noise rise pattern does not exist, the method continues to block 704 at which signal levels associated with the communication tower are monitored. On the other hand, if it is determined that a noise rise pattern exists in association with the monitored signal levels, a periodic interference is recognized, as indicated at block 708. At block 710, interference data associated with the periodic interference are calculated. Interference data may include, for example, a signal amplitude, an interference duration, an interference periodicity, and the like. In some embodiments, various interference data might be calculated in association with block 706 to determine if a noise rise pattern exists.

With reference to FIG. 8, in embodiments, method 800 can be performed at a communication tower, such as communication tower 204. In particular, method 800 might be performed by a beam modifier, such as beam modifier 216 of FIG. 2. Initially, at block 802, interference data indicating interference with a radar beam are referenced. Such interference data may include, for instance, a signal amplitude, an interference duration, an interference periodicity, and the like. At block 804, an interference periodicity and an interference duration are used to determine an extent of time during which one or more lobes of the communication tower are to be modified in power and/or direction such that the lobes do not interfere with a radar beam. Such an extent of time may include any unit of time or number of subframes (e.g., in a LTE environment). During the determined extent of time, the one or more lobes of the communication tower are modified in power and/or direction so that the lobes do not interfere with the radar beam. This is indicated at block 806. Stated differently, during the determined extent of time, the one or more lobes of the communication tower are modified in power and/or direction so that nulls align with the radar beam. As can be appreciated, each of the lobes may be individually modified in power and/or direction, for example, for a portion of the determined extent of time. At block 808, it is determined whether a next extent of time exists. In this way, it is determined if another cycle, recurrence, or interval occurrence of interference exists. If not, the method returns to block 808 to continue monitoring when a next extent of time exists. If, however, it is determined that a next extent of time exists, the method returns to block 806 to modify the power and/or direction of the one or more lobes of the communication tower to avoid or minimize interference with the radar beam.

With respect to FIG. 9, in embodiments, method 900 can be performed at a communication tower, such as communication tower 204. In particular, method 900 might be performed by an interference manager, such as interference manager 210 of FIG. 2. Initially, as indicated at block 902, a low traffic load is detected. Thereafter, at block 904, interference data is detected during the low traffic load time period. In embodiments, such interference data is associated with a periodic interference of a radar beam. At block 906, one or more communication tower beams are modified in accordance with the interference data including, for example, an interference periodicity and an interference duration. In this way, the beams associated with the communication tower do not interfere with the radar beams transmitted by a radar remote from the communication tower. The communication tower beams may be modified in magnitude and/or direction to avoid interference with the radar beams.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating mitigation of interference using beamforming, the method comprising:

utilizing interference periodicity and interference duration associated with interference of a radar beam to determine an extent of time during which one or more lobes of a communication tower are to be modified in power, direction, or a combination thereof;

upon an occurrence of the extent of time, modifying at least one of the one or more lobes of the communication tower in power, direction, or a combination thereof so that the at least one of the one or more lobes does not interfere with a radar beam emitted from a radar remote from the communication tower.

2. The media of claim 1 further comprising referencing the interference periodicity and the interference duration.

3. The media of claim 1, wherein the extent of time is measured in units of time.

4. The media of claim 1, wherein the extent of time is measured in subframes.

5. The media of claim 1, wherein the interference periodicity and the interference duration are determined based on a periodic interference detected in association with the radar.

6. The media of claim 1, wherein the interference periodicity and the interference duration are determined when a low traffic load is recognized.

7. The media of claim 6, wherein the at least one of the one or more lobes are modified such that a null align with the radar beam.

8. One or more non-transitory computer-readable storage media having computer-executable instructions embodied thereon that, when executed, perform a method for facilitating mitigation of interference using beamforming, the method comprising:

detecting a low traffic load at a communication tower;

calculating interference data during the low traffic load, the interference data comprising an interference periodicity and an interference duration that indicate a periodic interference associated with a radar remote from the communication tower; and at a time corresponding to the periodic interference, modifying one or more communication tower beams in accordance with the interference data indicating the periodic interference of the radar such that the one or more communication tower beams minimize interference with a radar beam from the radar.

9. The media of claim 8, wherein the low traffic load is detected when a monitored traffic load fails to meet a traffic load threshold.

10. The media of claim 8 further comprising monitoring signal levels when the low traffic load is detected to identify a signal pattern indicating the periodic interference associated with the radar.

11. The media of claim 10, wherein the signal pattern is analyzed to calculate the interference data.

12. The media of claim 8, wherein the one or more communication tower beams are modified by modifying a direction in which the one or more communication tower beams are pointed.

13. The media of claim 8, wherein the one or more communication tower beams are modified by modifying a power associated with the one or more communication tower beams.

14. The media of claim 8, wherein the one or more communication tower beams are independently modified to account for the periodic motion of the radar beam.

15. A method for facilitating mitigation of interference using beamforming, the method comprising:

recognizing a set of subframes during which a radar beam emitted from a radar that is remote from a communication tower would be oriented within a coverage area of one or more lobes of the communication tower; and applying a beamforming technique in association with the one or more lobes of the communication tower so that the one or more lobes do not interfere with the radar beam during the set of subframes that the radar beam would be oriented within the coverage area of the one or more lobes of the communication tower.

16. The system of claim 15, wherein the method is performed in a Long Term Evolution (LTE) environment.

17. The method of claim 15, wherein the radar beam and the one or more lobes operate in frequencies that cause interference with one another.

18. The method of claim 15, wherein the beamforming technique comprises generating or altering a direction of the one or more lobes of the communication tower.

19. The method of claim 15, wherein the beamforming technique comprises generating or altering a power associated with the one or more lobes of the communication tower.

20. The method of claim 15, wherein the orientation of the radar beam being within the coverage area of the one or more lobes of the communication tower occurs periodically.

\* \* \* \* \*